United States Patent
Jeon et al.

(10) Patent No.: US 8,134,466 B2
(45) Date of Patent: Mar. 13, 2012

(54) RFID SYSTEM PREVENTING RECOGNITION ERROR AND COMMUNICATION METHOD THEREOF

(75) Inventors: Ki-yong Jeon, Changwon (KR); Sung-ho Cho, Seoul (KR)

(73) Assignees: Samsung Techwin Co., Ltd., Changwon (KR); Industry-University Cooperation Foundation Hanyang Universtiy, Seoul (KR)

( * ) Notice: Subject to any disclaimer, the term of this patent is extended or adjusted under 35 U.S.C. 154(b) by 334 days.

(21) Appl. No.: 12/315,562

(22) Filed: Dec. 4, 2008

(65) Prior Publication Data

US 2009/0184838 A1 Jul. 23, 2009

(30) Foreign Application Priority Data

Jan. 23, 2008 (KR) .................. 10-2008-0007081

(51) Int. Cl.
- G08B 13/14 (2006.01)
- G08B 29/00 (2006.01)
- H04Q 5/22 (2006.01)

(52) U.S. Cl. ............... 340/572.1; 340/10.1; 340/508; 340/568.1; 340/572.4

(58) Field of Classification Search .............. 340/10.1, 340/10.4, 10.42, 572.1, 572.4, 572.7, 572.8, 340/508
See application file for complete search history.

(56) References Cited

U.S. PATENT DOCUMENTS

| | | | |
|---|---|---|---|
| 5,886,634 A * | 3/1999 | Muhme | 340/572.1 |
| 7,075,412 B1 * | 7/2006 | Reynolds et al. | 340/10.2 |
| 7,091,860 B2 * | 8/2006 | Martinez de Velasco Cortina et al. | 340/572.1 |
| 7,176,784 B2 * | 2/2007 | Gilbert et al. | 340/10.34 |
| 7,339,481 B2 * | 3/2008 | Duron | 340/572.7 |
| 7,405,663 B2 * | 7/2008 | Lieffort et al. | 340/572.4 |
| 7,420,469 B1 * | 9/2008 | Oliver | 340/572.4 |
| 7,460,018 B2 * | 12/2008 | Kubo | 340/572.7 |
| 7,501,954 B1 * | 3/2009 | Chung | 340/572.7 |
| 7,591,422 B2 * | 9/2009 | Maitin | 235/383 |
| 7,701,346 B2 * | 4/2010 | Lindsay et al. | 340/572.3 |
| 7,750,792 B2 * | 7/2010 | Smith et al. | 340/10.4 |
| 2004/0074976 A1 * | 4/2004 | Becker et al. | 235/492 |
| 2004/0263319 A1 * | 12/2004 | Huomo | 340/10.2 |
| 2005/0122212 A1 * | 6/2005 | Enguent | 340/10.1 |
| 2005/0242957 A1 * | 11/2005 | Lindsay et al. | 340/572.7 |
| 2006/0202835 A1 * | 9/2006 | Thibault | 340/573.1 |
| 2006/0290473 A1 * | 12/2006 | Mahasenan et al. | 340/10.2 |
| 2007/0013521 A1 * | 1/2007 | Lindsay et al. | 340/572.1 |
| 2008/0150698 A1 * | 6/2008 | Smith et al. | 340/10.4 |
| 2008/0238686 A1 * | 10/2008 | Tuttle | 340/572.7 |

* cited by examiner

*Primary Examiner* — Daniel Wu
*Assistant Examiner* — Emily C Terrell
(74) *Attorney, Agent, or Firm* — Drinker Biddle & Reath LLP

(57) ABSTRACT

A radio frequency identification (RFID) tag is provided that prevents a recognition error of the RFID tag due to the occurrence of a shadow region. The RFID tag includes a first tag performing communication with an RFID reader and a second tag connected to the first tag and suitable for use with a different communication type from the first tag. Thus, when information stored in the first tag can not be read, the second tag is activated and externally transmits information and when information stored in the first tag can be read, the second tag is deactivated and does not externally transmit information. A communication method of an RFID system including an RFID reader communicating with an RFID tag is also provided.

10 Claims, 5 Drawing Sheets

RFID SYSTEM PREVENTING RECOGNITION ERROR AND COMMUNICATION METHOD THEREOF

CROSS-REFERENCE TO RELATED PATENT APPLICATION

This application claims the benefit of Korean Patent Application No. 10-2008-0007081, filed on Jan. 23, 2008 in the Korean Intellectual Property Office, the entire contents of which is incorporated herein by reference.

BACKGROUND OF THE INVENTION

1. Field of the Invention

The present invention relates to a radio frequency identification (RFID) system and communication method thereof. More particularly, the present invention relates to an RFID system having an RFID reader and an RFID tag, the RFID system preventing a recognition error of a signal transmitted from an RFID tag, and a communication method thereof.

2. Description of the Related Art

Radio frequency identification (RFID) is a radio frequency recognition technology which identifies an object at a distance by using a radio frequency ranging from MHz to GHz. In RFID, a frequency band is wide, several types of frequencies can be used, and different frequencies can be utilized according to the requirements of particular applications.

RFID has been acknowledged as a key technology for optimizing supply chain management (SCM) technology among existing technologies. In other words, all information with regard to identification, position movement tracking, and profile management of an object can be generated and processed by using RFID technology in an SCM network. In addition, RFID is the technology closest to realizing a ubiquitous network among existing various technologies. As a result, its importance has increased.

In RFID in an ultra high frequency (UHF) band, an RFID tag can be recognized at a distance of approximately 8.4 m in a wireless environment. Such an RFID tag contains a unique identification number (UID). In other words, the RFID tag is attached to an object and stores the UID of the object. An RFID reader identifies the UID of the RFID tag via wireless communication and can read additional information about the object stored in a storage space of the RFID tag.

RFID systems in a UHF band, in comparison with conventional wireless communication systems, are characterized in that the power of a signal transmitted to an RFID tag from an RFID reader is large (e.g. 30 dBm) and the response power of a signal transmitted to the RFID reader from the RFID tag is very small (e.g. −60 dBm). As a result, the RFID reader may not exactly recognize a signal transmitted by the RFID tag.

The RFID tag operates under the power of a radio frequency (RF) electromagnetic field transmitted by the RFID reader. Accordingly, the operation of the RFID tag is constrained by the RF electromagnetic field transmitted by the RFID reader. Thus, a shadow region, in which the RF electromagnetic field does not extend to, may exist. This may lead to reading errors/failure of an RFID tag.

The above-discussed problem is the most serious problem that exists as an obstacle to the commercialization of RFID systems. In other words, when a tag cannot be recognized when goods are delivered from a store or a warehouse, the primary reason for installing the RFID system, i.e. quick and easy identification, cannot be realized. Thus, a technology is necessary that prevents a response error, which causes a user to identify the occurrence of an unrecognized RFID tag.

SUMMARY OF THE INVENTION

The present invention provides a radio frequency identification (RFID) tag and a communication method of an RFID system, the RFID tag preventing a response error of the RFID tag due to the occurrence of a shadow region. The communication method of the present invention prevents a response error of an RFID tag due to the occurrence of a shadow region.

According to an embodiment of the present invention, a radio frequency identification (RFID) tag is provided. The RFID tag includes: a first tag performing communication with an RFID reader; and a second tag connected to the first tag and suitable for use with a different communication type from the first tag, wherein when information stored in the first tag is not readable, the second tag is activated and externally transmits information and when information stored in the first tag is readable, the second tag is deactivated and does not externally transmit information.

The second tag may not communicate with the RFID reader and may communicate with another RFID reader having the same communication type as that of the second tag.

The first tag may include a first antenna transmitting and receiving a signal in a wireless manner; a first demodulator demodulating the signal transmitted from the first antenna; a first voltage multiplier receiving the signal transmitted from the first antenna and outputting a first power supply voltage; a memory in which information is stored; a first control logic operating due to the first power supply voltage, receiving a signal output by the first demodulator, reading and outputting information stored in the memory and transmitting a control signal indicating whether information stored in the memory is successfully read, to the second tag; and a first modulator modulating a signal output by the first control logic and the modulated signal to the first antenna.

The second tag may include a second antenna transmitting and receiving a signal in a wireless manner; a second demodulator demodulating the signal transmitted from the second antenna; a second voltage multiplier connected to the first tag and activated or deactivated according to a signal transmitted from the first tag, receiving the signal transmitted from the second antenna and outputting a second power supply voltage during activation, and not outputting the second power supply voltage during deactivation; a second control logic operating due to the second power supply voltage, receiving a signal output by the second demodulator, and outputting predetermined information; and a second modulator modulating a signal output by the second control logic and the modulated signal to the second antenna.

According to another embodiment of the present invention, a communication method of a radio frequency identification (RFID) system comprising first and second RFID readers communicating with an RFID tag in a state where the RFID tag having first and second tags is attached to a product is provided. The communication method includes: (a) when the product reaches a first position, the first RFID reader attempting to form a communication connection with the first tag, and when communication connection is successful, the first RFID reader reading information stored in the first tag; and (b) when the product reaches a second position, the second RFID reader attempting to form a communication connection with the second tag, and when communication connection is successful, the second RFID reader communicating with the second tag and allowing an alarm device to generate an alarm.

When information stored in the first tag is read in (a), the second RFID reader may not communicate with the second tag, and when information stored in the first tag is not read in (a), the second RFID reader may communicate with the second tag.

The first and second RFID readers may simultaneously communicate with the RFID tags attached to a plurality of products.

According to another embodiment of the present invention, a communication method of a radio frequency identification (RFID) system comprising an RFID reader communicating with an RFID tag in a state where the RFID tag having first and second tags is attached to a product is provided. The communication method includes: (a) when the product reaches a first position, the RFID reader attempting to form a communication connection with the first tag, and when communication connection is successful, the RFID reader reading information stored in the first tag; and (b) when the product reaches a second position, the RFID reader changing a communication type to attempt to form a communication connection with the second tag, and when communication connection is successful, the RFID reader communicating with the second tag and generating an alarm.

When information stored in the first tag is read in (a), the RFID reader may not communicate with the second tag, and when information stored in the first tag is not read in (a), the RFID reader may communicate with the second tag.

The RFID reader may simultaneously communicate with the RFID tags attached to a plurality of products.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Figure 1:
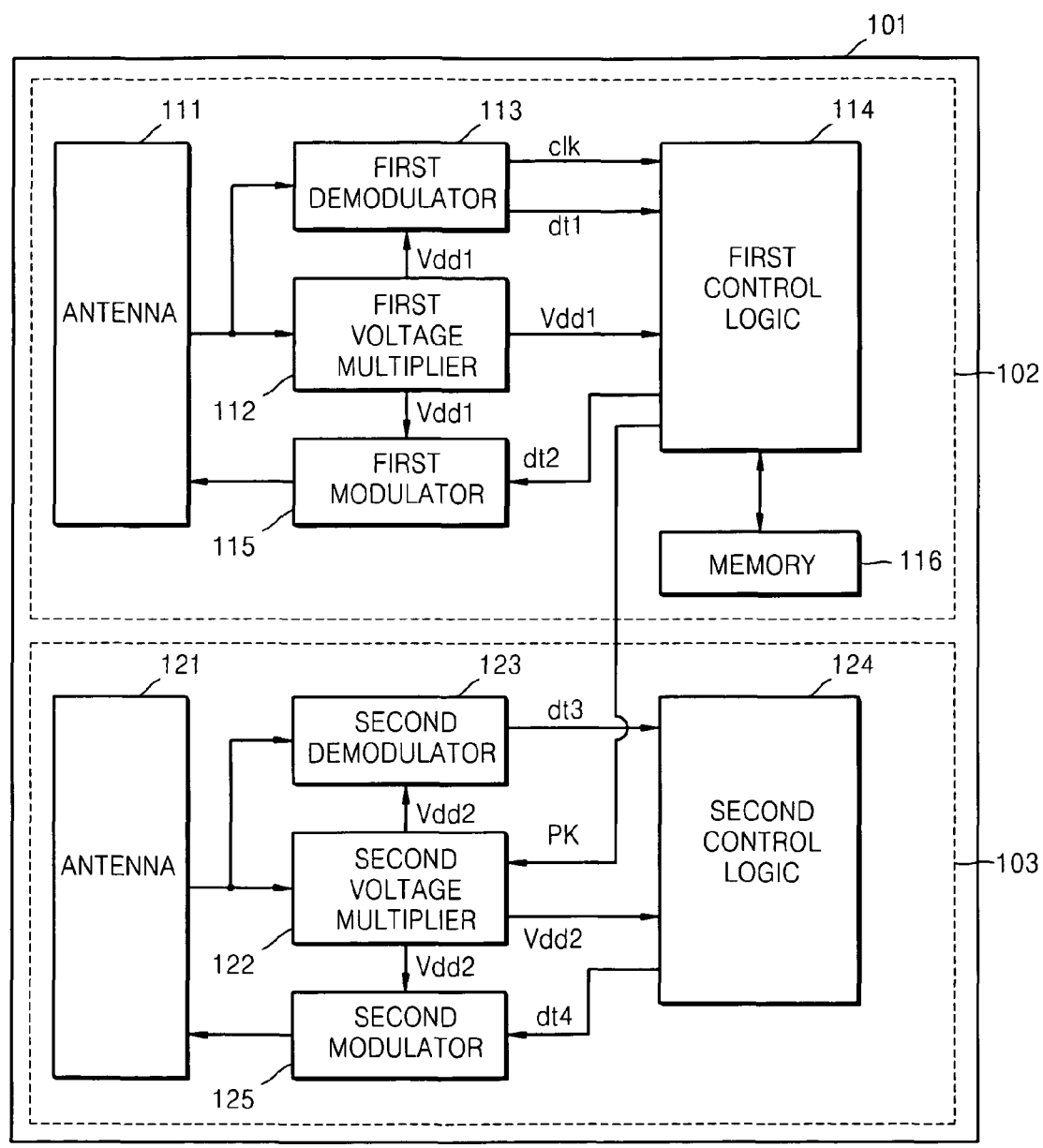
FIG. 1 is a block diagram of an example of a radio frequency identification (RFID) tag according to an embodiment of the present invention.

Hereinafter, the present invention will be described in detail by explaining exemplary embodiments of the invention with reference to the attached drawings. Like reference numerals in the drawings denote like elements.

FIG. 1 is a block diagram of an example of an RFID tag according to an embodiment of the present invention. Referring to FIG. 1, an RFID tag 101 according to the present embodiment of the present invention includes a first tag 102 and a second tag 103. The first tag 102 and the second tag 103 are sealed in one sealing unit, for example. The first tag 102 and the second tag 103 may be suitable for use in different communication types. In this example, the first tag 102 is a tag suitable for an ultra high frequency (UHF) band for electronic product code (EPC) class 1 (C1) generation 2 (Gen2), and the second tag 103 is a tag suitable for a very high frequency (VHF) band, for example, 900 MHz or 13.56 MHz. Currently, a tag for EPC C1 Gen2 is registered in ISO/IEC and has been widely used.

The first tag 102 in this example includes a first antenna 111, a first voltage multiplier 112, a first demodulator 113, a first control logic 114, a memory 116, and a first modulator 115.

The first antenna 111 receives a signal transmitted from an RFID reader (105a of FIG. 2A) in a wireless manner, transmits the signal to the first demodulator 113 and the first voltage multiplier 112, and transmits a signal output by the first modulator 115 to the RFID reader (105a of FIG. 2A) in a wireless manner.

The first voltage multiplier 112 in this example receives a voltage signal included in the signal transmitted through the first antenna 111, increases the voltage multiplication of the voltage signal, generates a first power supply voltage Vdd1, and supplies the first power supply voltage Vdd1 to the first demodulator 113, the first control logic 114, and the first modulator 115.

The first demodulator 113 operates in response to the first power supply voltage Vdd1, receives the signal transmitted through the first antenna 111, demodulates the signal, and transmits the demodulated signal to the first control logic 114. The first demodulator 113 transmits a clock signal clk and a data signal dt1 to the first control logic 114.

The first control logic 114 operates in response to the first power supply voltage Vdd1, reads data stored in the memory 116 and transmits read data to the first modulator 115 when output signals clk and dt1 of the first demodulator 113 are input. In this regard, the first control logic 114 is synchronized with the clock signal clk output by the first demodulator 113, reads data stored in the memory 116, and transmits read data. The first control logic 114 transmits a control signal PK to a second voltage multiplier 122.

The memory 116 may be a device in which data is stored and is easily written, for example, an electrically erasable programmable read only memory (EEPROM), a dynamic random access memory (DRAM) or a flash memory, and the like. Data stored in the memory 116 may include specific information, for example, information about the nationality, production place, price, production date, and validity period and the like of a product to which the RFID tag 101 is attached.

The first modulator 115 operates in response to the first power supply voltage Vdd1, receives a signal dt2 output by the first control logic 114, modulates the signal dt2, and transmits the modulated signal to the first antenna 111. The first modulator 115 in this example may use frequency modulation (FM) 0 so as to modulate the input signal dt2. FM 0 is defined by the ISO/IEC 18000-6 standard and is a common modulation technique, which is used in a response signal transmitted to the RFID reader (105a of FIG. 2A) from the RFID tag 101. Types of FM 0 include type A, type B, and type C. Types A and B use only FM 0, and type C uses one of FM 0 and a miller subcarrier. In FM 0, data and waveforms are simple 1o and may be easily used as compared to a miller subcarrier.

The second tag 103 in this example includes a second antenna 121, a second demodulator 123, a second voltage multiplier 122, a second control logic 124, and a second modulator 125.

The second antenna 121 in this example receives a signal transmitted from an RFID reader (105b of FIG. 2A) in a wireless manner, transmits the signal to the second demodulator 123 and the second voltage multiplier 122, and transmits a signal output by the second modulator 125 to the RFID reader (105*b* of FIG. 2A) in a wireless manner.

The second voltage multiplier 122 increases the voltage included in the signal transmitted through the second antenna 121, generates a second power supply voltage Vdd2, and transmits the second power supply voltage Vdd2 to the second demodulator 123, the second control logic 124, and the second modulator 125.

In addition, the second voltage multiplier 122 inputs a control signal PK output by the first control logic 114 of the first tag 102 and operates according to information of the control signal PK. In other words, when the control signal PK has first information, i.e., when the control signal PK is a signal at logic low, the second voltage multiplier 122 outputs the second power supply voltage Vdd2 and supplies the second power supply voltage Vdd2 to the second demodulator 123, the second control logic 124, and the second modulator 125.

However, when the control signal PK has second information, i.e., when the control signal PK is a signal at logic high, the second voltage multiplier 122 does not output the second power supply voltage Vdd2. For example, an indication bit indicating whether the RFID reader (105*a* of FIG. 2A) recognizes the first tag 102 or reads data stored in the memory 116 is stored in a predetermined region of the memory 116. The indication bit is initially at "0" and is changed into "1" after the RFID reader (105*a* of FIG. 2A) recognizes the first tag 102 or reads the memory 116 of the first tag 102. The value of the indication bit is transmitted to the second voltage multiplier 122 through the control signal PK. Since the control signal PK is maintained at logic low due to the value of the indication bit in the normal state, the second voltage multiplier 122 is not affected by the control signal PK and is activated and may perform a normal operation.

After that, when the first tag 102 is recognized or the content of the memory 116 of the first tag 102 is read while the RFID reader (105*a* of FIG. 2A) performs communication with the RFID tag 101, the control signal PK is changed from logic low to logic high due to the indication bit. As such, the second voltage multiplier 122 is deactivated and does not output the second power supply voltage Vdd2. When the level of the control signal PK is changed into logic high, the second voltage multiplier 122 does not operate. As an example of a method of controlling the operation of the second voltage multiplier 122 using the control signal PK, a fuse is provided at an output terminal of the second voltage multiplier 122. Thus, when the fuse is connected to the second voltage multiplier 122, the second voltage multiplier 122 outputs the second power supply voltage Vdd2. However, when the fuse is disconnected from the second voltage multiplier 122, the second voltage multiplier 122 does not output the second power supply voltage Vdd2. When the control signal PK is at a low level, the fuse is maintained to be connected to the second voltage multiplier 122, and when the level of the control signal PK is changed from logic low to logic high, the fuse is disconnected from the second voltage multiplier 122.

When the second voltage multiplier 122 does not output the second power supply voltage Vdd2, the second demodulator 123, the second control logic 124, and the second modulator 125 does not perform an operation.

The second demodulator 123 operates due to the second power supply voltage Vdd2, demodulates the signal transmitted through the second antenna 121, and transmits the demodulated signal to the second control logic 124. In this regard, the second demodulator 123 outputs only a data signal dt3 and transmits the data signal dt3 to the second control logic 124. In other words, the second demodulator 123 does not need to output the clock signal clk because the second control logic 124 does not comprise the memory 116.

The second demodulator 123 uses the same communication type demodulation as the RFID reader (105*b* of FIG. 2A) communicating with the second tag 103. The second demodulator 123 uses different communication type demodulation from the first demodulator 113. This is because the communication type of the RFID reader (105*a* of FIG. 2A) communicating with the first tag 102 and the communication type of the RFID reader (105*b* of FIG. 2A) communicating with the second tag 103 are different from each other.

The second control logic 124 operates due to the second power supply voltage Vdd2 and transmits a signal having predetermined information to the second modulator 125 when the output signal dt3 of the second demodulator 123 is input. In other words, the second control logic 124 does not comprise the memory 116 and thus cannot store much information. Since the second control logic 124 does not comprise the memory 116 in this way, the configuration of the second control logic 124 is very simple. Thus, a cost for manufacturing the second tag 103 is much lower than a cost for manufacturing the first tag 102.

The second modulator 125 operates due to the second power supply voltage Vdd2, receives a signal dt4 output by the second control logic 124, modulates the signal dt4, and transmits the modulated signal dt4 to the second antenna 121. The second modulator 125 uses the same communication type modulation as the RFID reader (105*b* of FIG. 2A) communicating with the second tag 103 so as to modulate the input signal dt4. In other words, the second modulator 125 uses a different communication type modulation from the first modulator 115. This is because the communication type of the RFID reader (105*a* of FIG. 2A) communicating with the first tag 102 and the communication type of the RFID reader (105*b* of FIG. 2A) communicating with the second tag 103 are different from each other.

According to an example of the present invention, the RFID tag 101 comprises two tags, the first and second tags 102 and 103, and when information stored in the memory 116 of the first tag 102 is not read, the second voltage multiplier 122 of the second tag 103 is activated and outputs the second power supply voltage Vdd2. As such, the second tag 103 may transmit information set in the second control logic 124 to the RFID reader (105*b* of FIG. 2A). However, when information stored in the memory 116 of the first tag 102 is read, the second voltage multiplier 122 of the second tag 103 is deactivated and does not output the second power supply voltage Vdd2. As such, the second tag 103 does not transmit information set in the second control logic 124 to the RFID reader (105*b* of FIG. 2A).

Figure 2A:
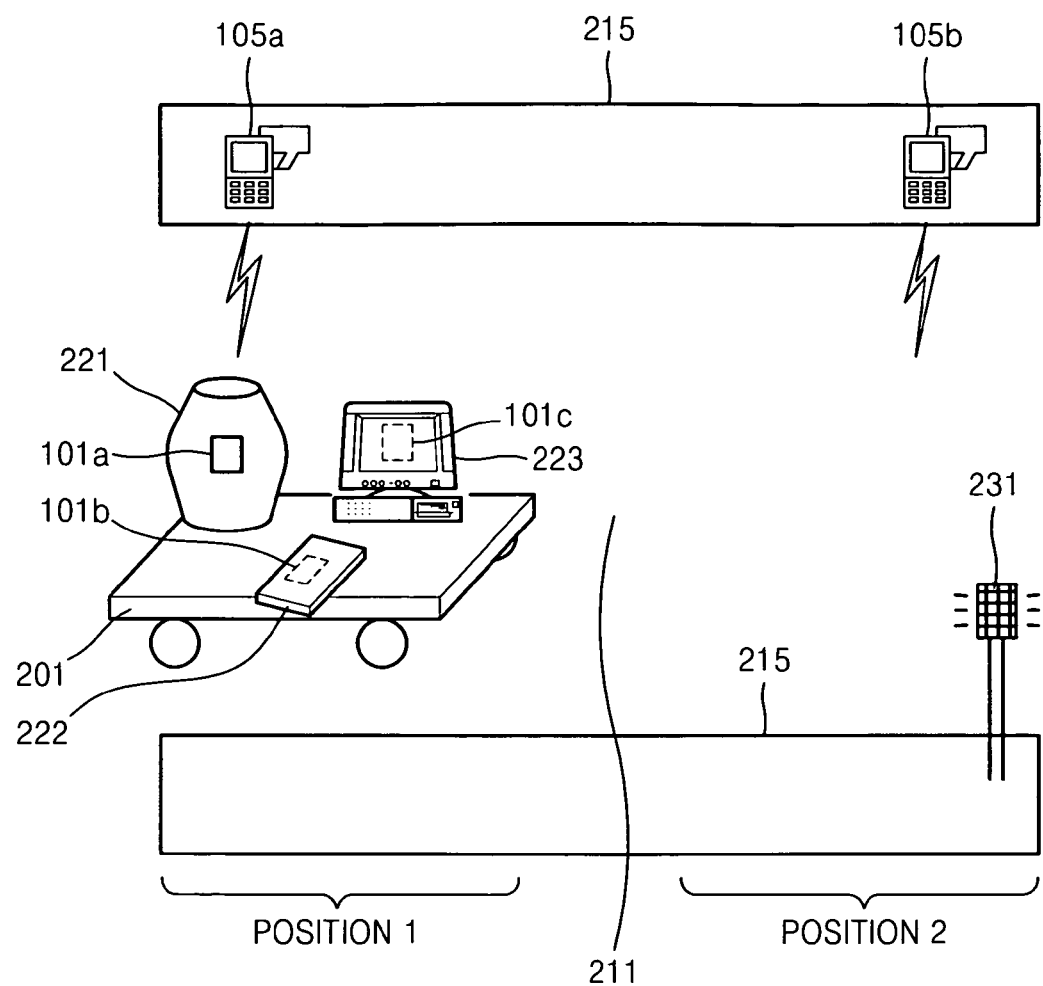
FIG. 2A illustrates an example of a communication method of an RFID system having the RFID tag of FIG. 1, according to an embodiment of the present invention.

FIG. 2A illustrates an example of a communication method of an RFID system having the RFID tag of FIG. 1, according to an embodiment of the present invention. Referring to FIG. 2A, walls 215 are installed at both sides of the RFID system, and a moving unit 201, for example, a passage along which a cart or a car drives, is formed in the middle of the RFID system, and first and second RFID readers 105*a* and 105*b* are installed at one of the walls 215 at regular intervals. An alarm device 231 is installed at the end of one of the walls 215. The alarm device 231 is connected to the second RFID reader 105*b* and generates alarm by receiving indication of the second RFID reader 105*b*. The communication type of the first RFID reader 105*a* and the communication type of the second RFID reader 105*b* are different from each other. In other words, the communication type of the first RFID reader 105*a* is the same as the communication type of the first tag 102 illustrated in FIG. 1 such that the first RFID reader 105a performs wireless communication with the first tag 102 and does not perform wireless communication with the second tag 103. In addition, the communication type of the second RFID reader 105b is the same as the communication type of the second tag 103 illustrated in FIG. 1 such that the second RFID reader 105b performs wireless communication with the second tag 103 and does not perform wireless communication with the first tag 102.

When a customer purchases products 221, 222, and 223 in a store, the customer must pay for the products 221, 222, and 223. To this end, a cashier calculates the price of each of the products 221, 222, and 223 at a counter.

In order to avoid such an inconvenience, according to the present invention, the RFID tag 101 illustrated in FIG. 1 is attached to each of the products 221, 222, and 223, and the first and second RFID readers 105a and 105b instead of the cashier are installed at the counter, and the price of each of the products 221, 222, and 223 to which the RFID tag 101 is attached is calculated by using the RFID readers 105a and 105b.

Thus, the price of each of the products 221, 222, and 223 to which the RFID tag 101 illustrated in FIG. 1 is attached can be calculated.

Figure 2B:
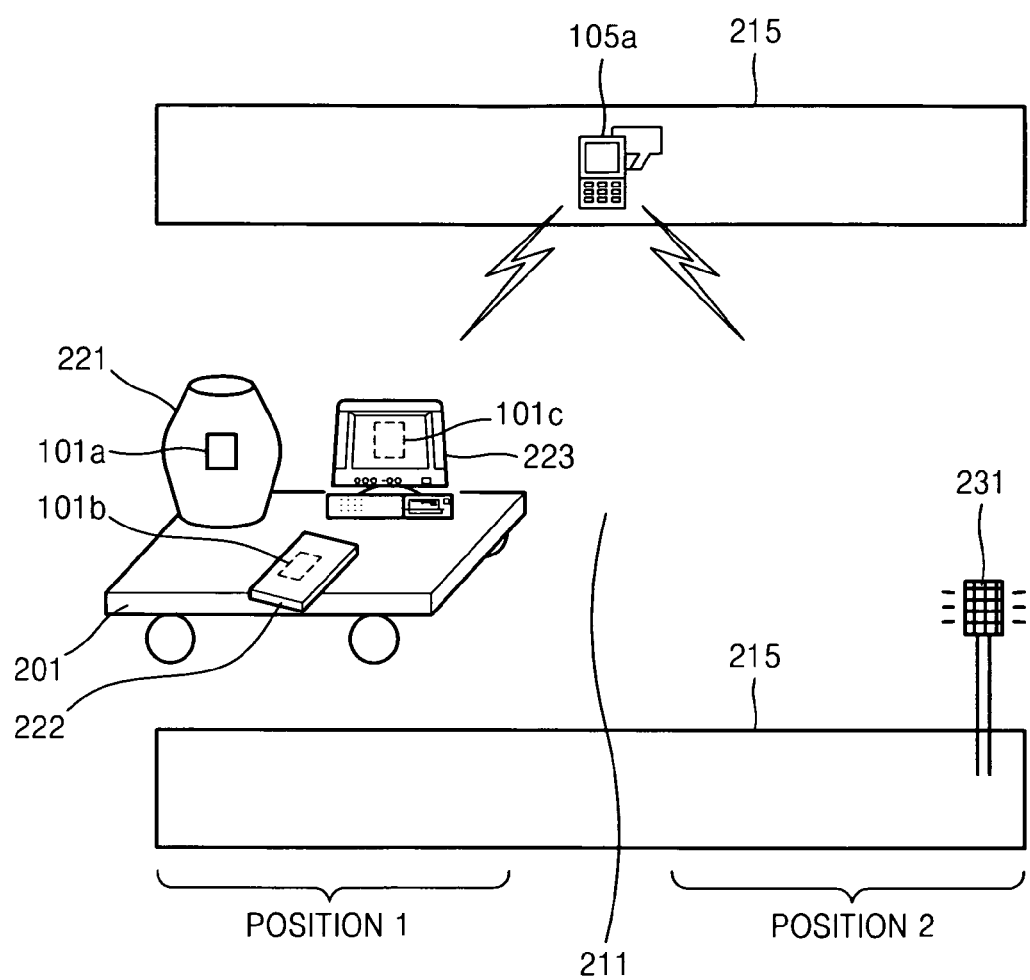
FIG. 2B illustrates an example of a communication method of an RFID system having the RFID tag of FIG. 1, according to an embodiment of the present invention.

FIG. 2B illustrates an example of a communication method of an RFID system having the RFID tag of FIG. 1, according to an embodiment of the present invention. Referring to FIG. 2B, an RFID reader 105a is installed at a side of a passage. The RFID reader 105a operates in different communication modes when the moving unit 201 enters position 1 and position 2. In other words, when the moving unit 201 loading the products 221, 222, and 223 enters position 1, the RFID reader 105a operates in a mode in which the RFID reader 105a communicates with the first tag 102 of each of RFID tags 101a, 101b, and 101c, and when the moving unit 201 enters position 2, the RFID reader 105a operates in a mode in which the RFID reader 105a communicates with the second tag 103 of each of RFID tags 101a, 101b, and 101c. As such, when the products 221, 222, and 223 are in position 1 and information stored in the memory 116 of the first tag 102 of each of the RFID tags 101a, 101b, and 101c is not read by the RFID reader 105a, all of the RFID tags 101a, 101b, and 101c attached to the products 221, 222, and 223 are checked by the RFID reader 105a because, when the products 221, 222, and 223 are in position 2, information stored in the second tag 103 of each of the RFID tags 101a, 101b, and 101c is read.

According to an example of the present invention, the prices of all of the products 221, 222, and 223 to which the RFID tags 101a, 101b, and 101c are attached can be calculated by using the RFID reader 105a.

Figure 3:
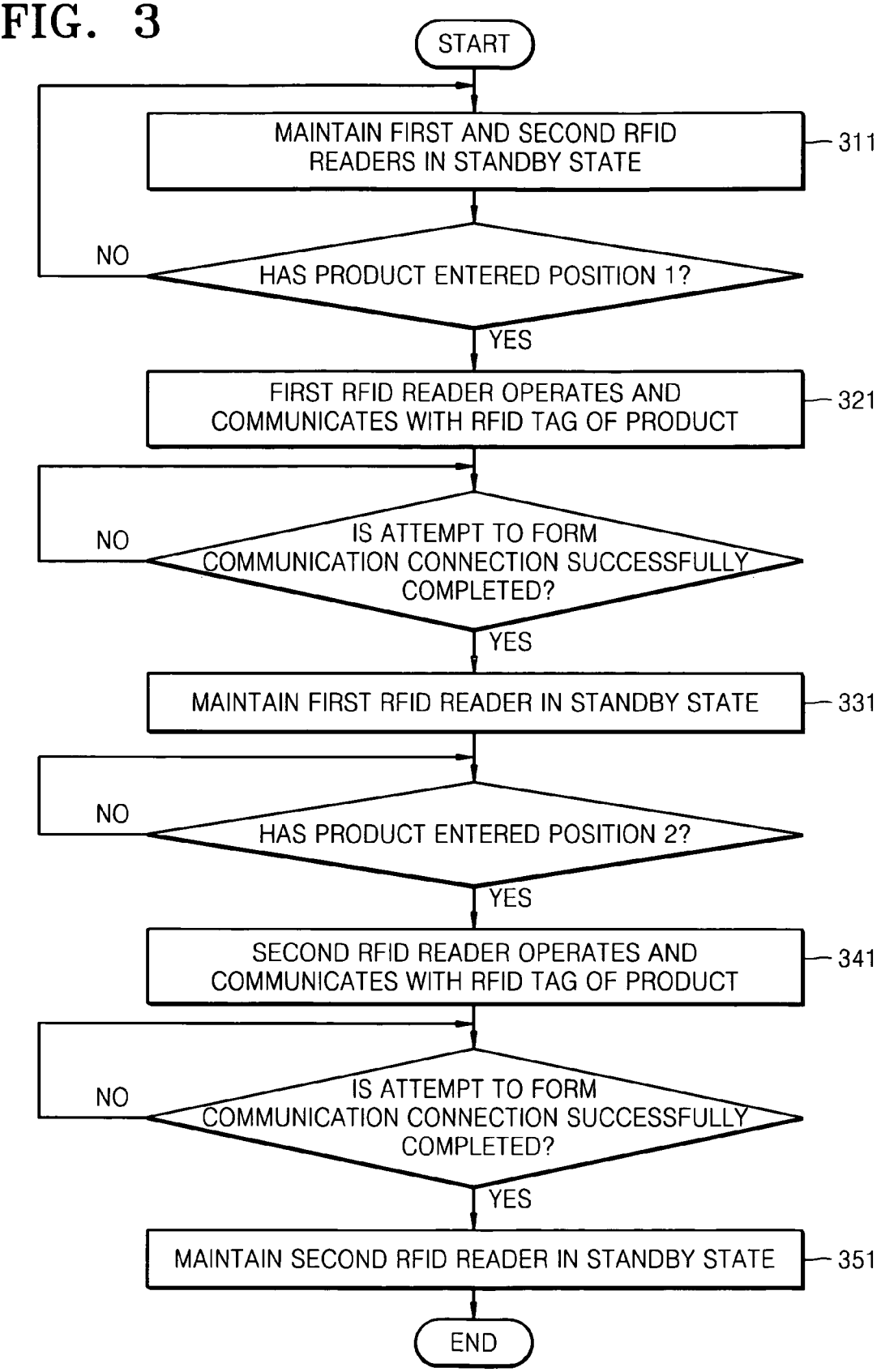
FIG. 3 is a flowchart illustrating an example of a communication method of an RFID system according to an embodiment of the present invention.

FIG. 3 is a flowchart illustrating an example of a communication method of an RFID system according to an embodiment of the present invention. Referring to FIG. 3, the communication method of the RFID system according to the present embodiment of the present invention comprises first through fifth operations 311 to 351. The communication method of the RFID system according to an example of the present invention will now be described with reference to FIGS. 1 and 2A.

In a first operation 311, the first and second RFID readers 105a and 105b are turned on and are maintained in a standby state. When the first and second RFID readers 105a and 105b are maintained in the standby state, power consumption is reduced as compared to an operating state.

In a second operation 321, when the moving unit 201 (a person may move the products 221, 222, and 223 by putting the products 221, 222, and 223 in a bag without using the moving unit 201) loading one or more products 221, 222, and 223 to which the RFID tag 101 of FIG. 1 is attached enters position 1 of the passage 211, the first RFID reader 105a is changed into an operating state from the standby state and attempts to form a communication connection with the RFID tags 101a, 101b, and 101c attached to the products 221, 222, and 223. In this regard, when communication connection with the RFID tag 101 is successful, the first RFID reader 105a obtains information stored in the memory 116 of the first tag 102 to calculate prices of the products 221, 222, and 223.

Here, when information stored in the memory 116 of the first tag 102 is read, the second voltage multiplier 122 of the second tag 103 is deactivated due to the control signal PK output by the first control logic 114, and the second tag 103 does not transmit data to the first RFID reader 105a. When information stored in the memory 116 of the first tag 102 is not read, the second voltage multiplier 122 of the second tag 103 is maintained in an activated state, and the second tag 103 transmits data to the first RFID reader 105a.

When the moving unit 201 loading the products 221, 222, and 223 does not enter position 1, the first RFID reader 105a is continuously maintained in the standby state.

When a sensor is installed near position 1 or at the first RFID reader 105a and the sensor senses that the moving unit 201 enters position 1 and informs the first RFID reader 105a of the result of sensing, the first RFID reader 105a may be changed into the operating state from the standby state.

In third operation 331, when a communication connection attempt with all of the RFID tags 101a, 101b, and 101c is finished, the first RFID reader 105a returns to the standby state.

In fourth operation 341, when the moving unit 201 enters position 2 of the passage 211, the second RFID reader 105b is changed into the operating state from the standby state and attempts to form a communication connection with the RFID tags 101a, 101b, and 101c attached to the products 221, 222, and 223. When the first RFID reader 105a reads information stored in all of the RFID tags 101a, 101b, and 101c in operation 321, the second tags 103 of the RFID tags 101a, 101b, and 101c do not operate such that the second RFID reader 105b does not attempt to form a communication connection with the RFID tags 101a, 101b, and 101c and does not obtain any information from the RFID tags 101a, 101b, and 101c.

However, when there is information that is stored in the memory 116 and is not read by the second RFID reader 105b from at least one among from the RFID tags 101a, 101b, and 101c in the second operation 321, the second RFID reader 105b communicates with the RFID tags 101a, 101b, and 101c and obtains specific information set in the RFID tags 101a, 101b, and 101c. The fact that the second RFID reader 105b obtains information from a specific RFID tag means that there is an RFID tag that is not recognized by the first RFID reader 105a in the second operation 321. Thus, the second RFID reader 105b immediately allows the alarm device 231 to generate an alarm and informs a product manager of the result of obtaining information.

In fifth operation 351, when the second RFID reader 105b finishes communication with respect to the RFID tags 101a, 101b, and 101c, i.e., when a communication connection attempt with all of the RFID tags 101a, 101b, and 101c is finished, the second RFID reader 105b returns to the standby state.

In first through fifth operations 311 to 351, the first and second RFID readers 105a and 105b are not maintained in the standby state but may be maintained in the operating state. In this case, power consumption is increased as compared to the standby state.

As described in the above example, each of the first and second RFID readers 105a and 105b may simultaneously communicate with the RFID tags 101a, 101b, and 101c respectively attached to the products 221, 222, and 223.

According to an example of the present invention, the forming of a communication connection with the RFID tags 101a, 101b, and 101c attached to one or more products 221, 222, and 223 is attempted by using the first and second RFID readers 105a and 105b a plurality of times such that a response error of the RFID tag 101 due to the presence of a shadow region is prevented.

Figure 4:
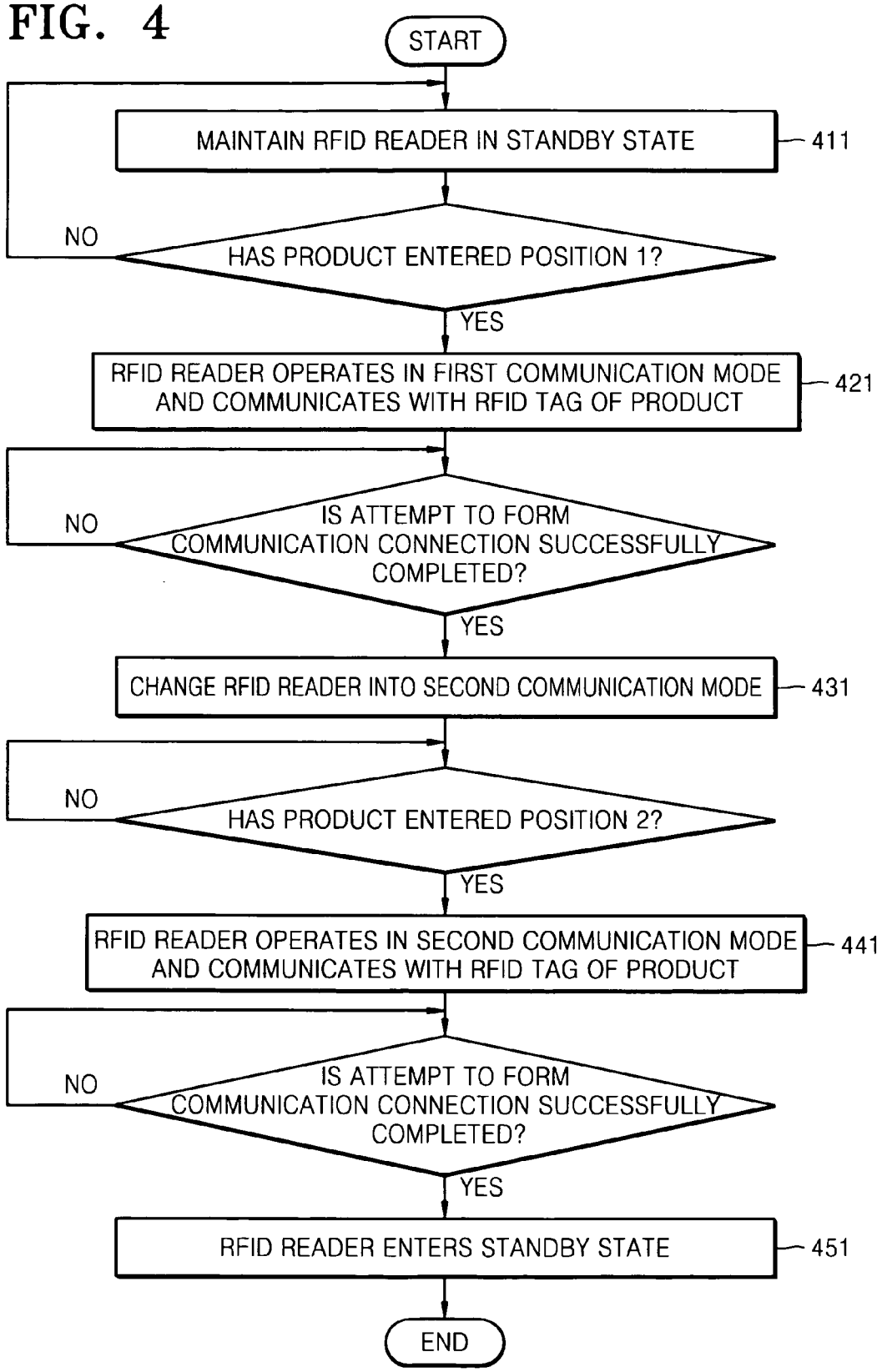
FIG. 4 is a flowchart illustrating an example of a communication method of an RFID system according to another embodiment of the present invention.

FIG. 4 is a flowchart illustrating an example of a communication method of an RFID system according to another embodiment of the present invention. Referring to FIG. 4, the communication method of the RFID system according to the present embodiment of the present invention comprises first through fifth operations 411 to 451. The communication method of the RFID system according to an example of the present invention will now be described with reference to FIGS. 1 and 2B.

In a first operation 411, the first RFID reader 105a is turned on and is maintained in a standby state. When the first RFID reader 105a is maintained in the standby state, power consumption is reduced as compared to an operating state.

In a second operation 421, when the moving unit 201 (a person may move the products 221, 222, and 223 by putting the products 221, 222, and 223 in a bag without using the moving unit 201) loading one or more products 221, 222, and 223 to which the RFID tag 101 of FIG. 1 is attached enters position 1 of the passage 211, the first RFID reader 105a is set in a first communication mode, i.e., in a communication mode in which the first RFID reader 105a communicates with the first tag 102 of the RFID tag 101 of FIG. 1, and attempts to form a communication connection with the RFID tags 101a, 101b, and 101c attached to the products 221, 222, and 223. In this regard, when communication connection with the RFID tag 101 is successful, the first RFID reader 105a obtains information stored in the memory 116 of the first tag 102 to calculate prices of the products 221, 222, and 223. Here, when information stored in the memory 116 of the first tag 102 is read, the second voltage multiplier 122 of the second tag 103 is deactivated due to the control signal PK output by the first control logic 114, and the second tag 103 does not transmit data to the first RFID reader 105a. When information stored in the memory 116 of the first tag 102 is not read, the second voltage multiplier 122 of the second tag 103 is maintained in an activated state, and the second tag 103 transmits data to the first RFID reader 105a.

When the moving unit 201 loading the products 221, 222, and 223 does not enter position 1, the first RFID reader 105a is continuously maintained in the standby state.

When a sensor is installed near position 1 or at the first RFID reader 105a and the sensor senses that the moving unit 201 enters position 1 and informs the first RFID reader 105a of the result of sensing, the first RFID reader 105a may be changed into the operating state from the standby state.

In a third operation 431, when attempts to form a communication connection with all of the RFID tags 101a, 101b, and 101c is successfully completed, the first RFID reader 105a is changed into a second communication mode. In other words, the RFID reader 105a is changed into a mode in which the RFID reader 105a communicates with the second tag 103.

In a fourth operation 441, when the moving unit 201 enters position 2 of the passage 211, the first RFID reader 105a attempts to form a communication connection with the second tags 103 of the RFID tags 101a, 101b, and 101c attached to the products 221, 222, and 223. When the first RFID reader 105a reads information stored in the memories 116 all of the RFID tags 101a, 101b, and 101c in second operation 421, the second tags 103 of the RFID tags 101a, 101b, and 101c do not operate such that the first RFID reader 105a does not attempt to form communication connection with the RFID tags 101a, 101b, and 101c and does not obtain any information from the RFID tags 101a, 101b, and 101c. However, when there is information that is stored in the memory 116 and is not read by the first RFID reader 105a from one among from the RFID tags 101a, 101b, and 101c in second operation 421, the first RFID reader 105a performs communication with the RFID tags 101a, 101b, and 101c and obtains specific information set in the RFID tags 101a, 101b, and 101c. The fact that the first RFID reader 105a obtains information from the RFID tag 101 means that there is an RFID tag that is not recognized by the first RFID reader 105a in the second operation 421. Thus, the first RFID reader 105a immediately allows the alarm device 231 to generate an alarm and informs a product manager of the result of obtaining information.

In a fifth operation 451, when the first RFID reader 105a finishes communication with respect to the RFID tags 101a, 101b, and 101c loaded by the moving unit 201, i.e., when attempts to form a communication connection with all of the RFID tags 101a, 101b, and 101c is successfully completed, the first RFID reader 105a returns to the standby state.

In the first through fifth operations 411 to 451, the first RFID reader 105a is not maintained in the standby state but may be maintained in the operating state. In this case, power consumption is increased as compared to the standby state.

As described above, in this example the first RFID reader 105a may communicate with the RFID tags 101a, 101b, and 101c respectively attached to the products 221, 222, and 223 at one time.

According to an example of the present invention, forming of a communication connection with the RFID tags 101a, 101b, and 101c attached to one or more products 221, 222, and 223 is attempted by using the first RFID reader 105a a plurality of times such that a response error of the RFID tag 101 due to the occurrence of a shadow region is prevented.

In the RFID tag (101 of FIG. 1) according to an example of the present invention, different communication types of tags (102 and 103 of FIG. 1) are provided in one sealing unit, and when information stored in the memory (116 of FIG. 1) of the first tag (102 of FIG. 1) is not read, the second tag (103 of FIG. 1) can externally transmit information, and when information stored in the memory (116 of FIG. 1) of the first tag (102 of FIG. 1) is read, the second tag (103 of FIG. 1) cannot externally transmit information.

In addition, according to an example of the present invention, the RFID tag (101 of FIG. 1) is attached to the products (221, 222, and 223 of FIG. 2A), and forming of a communication connection with the RFID tags (101 of FIG. 1) attached to the products (221, 222, and 223 of FIG. 2A) is attempted a plurality of times by using one or two RFID readers (105a and 105b of FIG. 2A) such that a response error of the RFID tag (101 of FIG. 1) due to the occurrence of the shadow region is prevented.

While this invention has been particularly shown and described with reference to exemplary embodiments thereof, it will be understood by those having ordinary skill in the art that various changes in form and details may be made therein without departing from the spirit and scope of the invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. A radio frequency identification (RFID) tag comprising packaging having sealed within:
   a first tag for performing communication of a first communication type with an RFID reader; and
   a second tag connected to the first tag and suitable for performing communication of a different communication type from the first communication type of the first tag with the RFID reader, wherein, when the first tag does not successfully communicate with the RFID reader, the first tag automatically activates the second tag, and, when the first tag successfully communicates with the RFID reader, the first tag automatically leaves the second tag deactivated and the second tag is unable to communicate with the RFID reader.

2. The RFID tag of claim 1, wherein the first tag does not communicate with the RFID reader and communicates with another RFID reader having the same communication type as that of the first tag.

3. The RFID tag of claim 1, wherein the first tag comprises:
   a first antenna for transmitting and receiving a signal in a wireless manner;
   a first demodulator for demodulating the signal transmitted from the first antenna;
   a first voltage multiplier for receiving the signal transmitted from the first antenna and outputting a first power supply voltage;
   a memory in which the information is to be stored;
   a first control logic for operating due to the first power supply voltage, for receiving a signal output by the first demodulator, for reading and outputting the information stored in the memory, and for transmitting a control signal indicating whether the first tag successfully transmitted the information to the RFID reader to the second tag; and
   a first modulator for modulating a signal output by the first control logic and for sending the modulated signal to the first antenna.

4. The RFID tag of claim 1, wherein the second tag comprises:
   a second antenna for transmitting and receiving a signal in a wireless manner;
   a second demodulator for demodulating the signal transmitted from the second antenna;
   a second voltage multiplier connected to the first tag and activated or deactivated according to a signal received from the first tag, for receiving the signal transmitted from the second antenna and for outputting a second power supply voltage during activation, and for not outputting the second power supply voltage during deactivation;
   a second control logic for operating due to the second power supply voltage, for receiving a signal output by the second demodulator, and for outputting the second tag identifier; and
   a second modulator for modulating the second tag identifier output by the second control logic and for sending the modulated signal to the second antenna.

5. A communication method of a radio frequency identification (RFID) system comprising first and second RFID readers communicating with an RFID tag attached to a product and having enclosed within first and second tags, the communication method comprising:
   (a) when the product reaches a first position, the first RFID reader attempting to form a first communication connection with the first tag storing information, when the communication connection is successful, the first RFID reader reading the information stored in the first tag and the first tag leaving the second tag deactivated, and, when the first communication connection is not successful, the first tag automatically activating the second tag; and
   (b) when the product reaches a second position, the second RFID reader attempting to form a second communication connection with the second tag, and, when the second communication connection is successful, the second RFID reader communicating with the second tag and allowing an alarm device to generate an alarm.

6. The communication method of claim 5, wherein, when the information stored in the first tag is read in (a), the second RFID reader is not able to communicate with the second tag and does not allow the alarm device to generate the alarm in (b), and when the information stored in the first tag is not read in (a), the second RFID reader is able to communicate with the second tag in (b).

7. The communication method of claim 5, wherein the first and second RFID readers simultaneously communicate with a plurality of RFID tags attached to respective ones of a plurality of products.

8. A communication method of a radio frequency identification (RFID) system comprising an RFID reader communicating with an RFID tag attached to a product and having sealed within first and second tags, the communication method comprising:
   (a) when the product reaches a first position, the RFID reader attempting to form a first communication connection with the first tag storing first information, and, when the first communication connection is successful, the RFID reader reading the first information stored in the first tag and the first tag not changing the second tag from a deactivated state to an activated state; and
   (b) when the product reaches a second position, the RFID reader changing a communication type to attempt to form a second communication connection with the second tag storing second information that is at least different from the first information, and, when the second communication connection is successful, the RFID reader reading the second information stored in the second tag and generating an alarm.

9. The communication method of claim 8, wherein, when the first information stored in the first tag is read in (a), the RFID reader is not able to communicate with the second tag and does not generate the alarm (b), and when the first information stored in the first tag is not read in (a), the RFID reader is able to communicate with the second tag in (b).

10. The communication method of claim 8, wherein the RFID reader simultaneously communicates with a plurality of RFID tags attached to respective ones of a plurality of products.

* * * * *